United States Patent
Petz

(10) Patent No.: US 11,573,911 B2
(45) Date of Patent: Feb. 7, 2023

(54) MEMORY ACCESS CONTROL

(71) Applicant: Arm Limited, Cambridge (GB)

(72) Inventor: Tamás Petz, Budapest (HU)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/269,411

(22) PCT Filed: Aug. 23, 2019

(86) PCT No.: PCT/GB2019/052373
§ 371 (c)(1),
(2) Date: Feb. 18, 2021

(87) PCT Pub. No.: WO2020/079387
PCT Pub. Date: Apr. 23, 2020

(65) Prior Publication Data
US 2021/0334220 A1    Oct. 28, 2021

(30) Foreign Application Priority Data
Oct. 15, 2018  (GB) ..................... 1816742

(51) Int. Cl.
*G06F 12/14*      (2006.01)
*G06F 12/1027*    (2016.01)

(52) U.S. Cl.
CPC ........ *G06F 12/145* (2013.01); *G06F 12/1027* (2013.01); *G06F 12/1425* (2013.01); *G06F 12/1458* (2013.01); *G06F 2212/1052* (2013.01)

(58) Field of Classification Search
CPC ........ G06F 12/14; G06F 12/10; G06F 12/145; G06F 12/1425; G06F 12/1458;
(Continued)

(56) References Cited

U.S. PATENT DOCUMENTS

| 2003/0070057 A1* | 4/2003 | Kakeda | G06F 12/1036 711/207 |
| 2006/0130068 A1* | 6/2006 | Rohr | G06F 9/451 718/107 |

(Continued)

FOREIGN PATENT DOCUMENTS

| TW | 201710908 | 3/2017 |
| WO | 97/36235 | 10/1997 |

OTHER PUBLICATIONS

Demystifying multithreading and multi-core by Kissell (Year: 2007).*

(Continued)

*Primary Examiner* — Paul M Knight
(74) *Attorney, Agent, or Firm* — Nixon & Vanderhye P.C.

(57) ABSTRACT

Apparatus comprises a multi-threaded processing element to execute processing threads as one or more process groups each of one or more processing threads, each process group having a process group identifier unique amongst the one or more process groups and being associated by capability data with a respective memory address range in a virtual memory address space; and memory address translation circuitry to translate a virtual memory address to a physical memory address by a processing thread of one of the process groups; the memory address translation circuitry being configured to associate, with a translation of a given virtual memory address to a corresponding physical memory address, permission data defining one or more process group identifiers representing respective process groups permitted to access the given virtual memory address, and to inhibit access to the given virtual memory address in dependence on the capability data associated with the process group of the processing thread requesting the memory access and a detection of whether the permission data defines the process (Continued)

group identifier of the process group of the processing thread requesting the memory access.

10 Claims, 12 Drawing Sheets

(58) Field of Classification Search
CPC ............. G06F 12/1441; G06F 12/1475; G06F 2212/1052; G06F 12/1027
See application file for complete search history.

(56) References Cited

U.S. PATENT DOCUMENTS

| | | | | |
|---|---|---|---|---|
| 2009/0182971 | A1* | 7/2009 | Greiner | G06F 12/1036 711/E12.059 |
| 2009/0254724 | A1* | 10/2009 | Vertes | G06F 9/526 711/162 |
| 2011/0010756 | A1* | 1/2011 | Choi | G06F 21/53 718/1 |
| 2015/0150145 | A1* | 5/2015 | Jones | G06F 12/1458 726/27 |
| 2016/0274810 | A1* | 9/2016 | Godard | G06F 9/3004 |
| 2017/0185418 | A1* | 6/2017 | Huang | G06F 8/654 |
| 2018/0307607 | A1* | 10/2018 | Sato | G06F 12/1009 |

OTHER PUBLICATIONS

CODOMs: Protecting Software with Code-centric Memory Domains by Vilanova (Year: 2014).*
CHERI: A Hybrid Capability-System Architecture for Scalable Software Compartmentalization by Watson (Year: 2015).*
International Search Report and Written Opinion of the ISA for PCT/GB2019/052373 dated Nov. 20, 2019, 14 pages.
Combined Search and Examination Report for GB1816742.9 dated Mar. 25, 2019, 5 pages.
Vilanova et al., "CODOMs: Protecting software with Code-centric memory Domains", 2014 ACM/IEEE 41$^{st}$ International Symposium on Computer Architecture (ISCA), IEEE, Jun. 14, 2014, pp. 469-480.
Robert Bedichek, "Some Efficient Architecture Simulation Techniques," Proceedings of the Winter 1990 USENIX Conference, Jan. 22-26, 1990, 12 pages.
Watson et al., "CHERI: A Hybrid Capability-System Architecture for Scalable Software Compartmentalization", 2015 IEEE Symposium on Security and Privacy, May 17-21, 2015, 18 pages.
Office Action and Search Report for TW Application No. 108132688 dated Dec. 7, 2022, 6 pages.

* cited by examiner

A)  SET  PR1 = 140000  ⟶ trigger error

B)  SET  PR1 = 140000

LD  R5,  PR1  ⟶ trigger error

| | Capability fields |
|---|---|
| Tag | Hardware managed enforcement of capability properties |
| Permissions | Individual permissions to perform operations |
| Bounds | A range of virtual addresses over which memory capabilities may permit access to memory, or A range of object types that may be used by sealing operations |
| Address | The address in address based capabilities |
| Object type | The object type in sealed and sealing capabilities |
| Seal | A Sub-format indicating whether a capability is encapsulated |

FIG. 4

| Inside of DDC bounds? | TD with CID found? | Accessible? |
|---|---|---|
| NO | NO | NO |
| YES | DON'T CARE | YES |
| DON'T CARE | YES | YES |
| YES | YES | YES |

FIG. 12

| Is capability valid? | TD with CID found? | Is memory mapped otherwise? | Accessible? |
|---|---|---|---|
| NO | DON'T CARE | DON'T CARE | NO |
| YES | NO | NO | NO |
| YES | NO | YES | YES |
| YES | YES | NO | YES |

FIG. 13

MEMORY ACCESS CONTROL

This application is the U.S. national phase of International Application No. PCT/GB2019/052373 filed Aug. 23, 2019 which designated the U.S. and claims priority to GB Patent Application No. 1816742.9 filed Oct. 15, 2018, the entire contents of each of which are hereby incorporated by reference.

BACKGROUND

This disclosure relates to memory access control.

Some examples of data processing apparatus handle processes as one or more so-called compartments or process groups, where each of the process groups includes one or more processing threads. Memory access is determined by so-called capability data, either an ambient (generic) capability in the case of a so-called hybrid compartment, or a compartment-specific capability in the case of a so-called pure compartment.

Examples of such compartments are discussed in the paper "CHERI: A Hybrid Capability-System Architecture for Scalable Software Compartmentalization", 2015 IEEE Symposium on Security and Privacy, 17-21 May 2015, ISBN 978-1-4673-6949-7, the contents of which are incorporated herein by reference.

It can be useful for compartments to communicate with one another by shared memory addresses or regions. However, it is then considered useful to be able to revoke such sharing access, for example to reallocate a memory address or region to another purpose. This can be difficult because at any time, it can be difficult for the system to know which ongoing references to the shared memory are still valid.

SUMMARY

In an example arrangement there is provided apparatus comprising:

a multi-threaded processing element to execute processing threads as one or more process groups each of one or more processing threads, each process group having a process group identifier unique amongst the one or more process groups and being associated by capability data with a respective memory address range in a virtual memory address space; and memory address translation circuitry to translate a virtual memory address to a physical memory address in response to a requested memory access by a processing thread of one of the process groups;

the memory address translation circuitry being configured to associate, with a translation of a given virtual memory address to a corresponding physical memory address, permission data defining one or more process group identifiers representing respective process groups permitted to access the given virtual memory address, and to inhibit access to the given virtual memory address in dependence on the capability data associated with the process group of the processing thread requesting the memory access and a detection of whether the permission data defines the process group identifier of the process group of the processing thread requesting the memory access.

In another example arrangement there is provided a method comprising:

executing processing threads, using a multi-threaded processing element, as one or more process groups each of one or more processing threads, each process group having a process group identifier unique amongst the one or more process groups and being associated by capability data with a respective memory address range in a virtual memory address space;

translating, using memory address translation circuitry, a virtual memory address to a physical memory address by a processing thread of one of the process groups;

the memory address translation circuitry associating, with a translation of a given virtual memory address to a corresponding physical memory address, permission data defining one or more process group identifiers representing respective process groups permitted to access the given virtual memory address; and the memory address translation circuitry inhibiting access to the given virtual memory address in dependence on the capability data associated with the process group of the processing thread requesting the memory access and a detection of whether the permission data defines the process group identifier of the process group of the processing thread requesting the memory access.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which:

FIG. 4 schematically represents a set of capability fields;

FIGS. 12 and 13 schematically illustrate memory access conditions;

DESCRIPTION OF EMBODIMENTS

Figure 1:
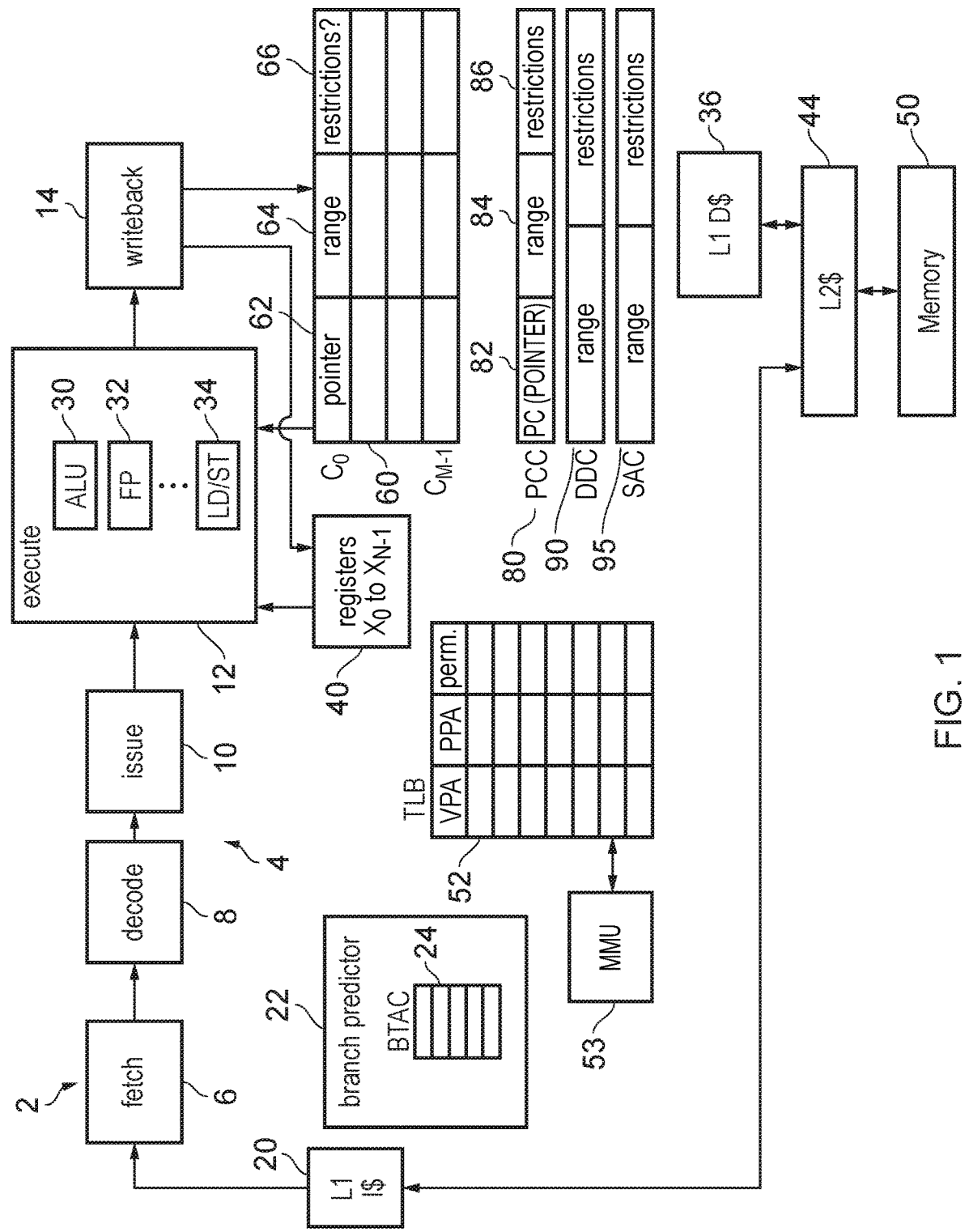
FIG. 1 schematically illustrates a data processing apparatus.

Before discussing the embodiments with reference to the accompanying figures, the following description of embodiments is provided.

An example embodiment provides apparatus comprising:

a multi-threaded processing element to execute processing threads as one or more process groups each of one or more processing threads, each process group having a process group identifier unique amongst the one or more process groups and being associated by capability data with a respective memory address range in a virtual memory address space; and memory address translation circuitry to translate a virtual memory address to a physical memory address in response to a requested memory access by a processing thread of one of the process groups;

the memory address translation circuitry being configured to associate, with a translation of a given virtual memory address to a corresponding physical memory address, permission data defining one or more process group identifiers representing respective process groups permitted to access the given virtual memory address, and to inhibit access to the given virtual memory address in dependence on the capability data associated with the process group of the processing thread requesting the memory access and a detection of whether the permission data defines the process group identifier of the process group of the processing thread requesting the memory access.

The present techniques can allow the sharing of memory addresses or regions between process groups or compartments using a control mechanism handled by memory address translation circuitry such as an MMU and/or TLB, so that the shared access can be revoked simply by changing the permission data held by the memory address translation circuitry.

In example arrangements the processing element is configured to implement a process group manager operable at least to allocate a process group identifier to each process group. For example, the process group manager may have other functionality such as being operable, for a memory address range for which access is to be shared between two or more process groups, to provide to the memory address translation circuitry the process group identifiers for the two or more process groups. In such a case the memory address translation circuitry can be configured to store the process group identifiers for the two or more process groups as the permission data. This can provide a convenient way of an overall process group manager maintaining the permission data held by the memory address translation circuitry. In some examples, the process group manager is configured to initiate revocation of access to a memory address range by a given process group initiating deletion from the permission data held by the memory address translation circuitry, of the process group identifier for the given process group.

In example arrangements the allowability of access can differ between different process group types. For example, for a first process group type, the capability data defines an allowable memory address range applicable to all process groups of the first type; and for a given process group of a second process group type, the capability data defines an allowable memory address range applicable to the given process group of the second process group type.

In some examples, for a given process group of the first process group type (such as, for example, a so-called hybrid type), the memory address translation circuitry is configured to allow access to the given virtual memory address when either or both of:

(i) the capability data indicates that the given virtual memory address lies within the allowable memory address range for the given process group; and (ii) the process group identifier for the given process group is a process group identifier defined by the permission data;

and to inhibit access otherwise.

In some examples, for a given process group of the second process group type 9 such as a so-called pure type), the memory address translation circuitry is configured to allow access to the given virtual memory address when both of:

(i) the capability data indicates that the given virtual memory address lies within the allowable memory address range for the given process group; and (ii) the process group identifier for the given process group is a process group identifier defined by the permission data;

and to inhibit access otherwise.

For example, the memory address translation circuitry may comprise one or both of: a memory management unit; and a translation lookaside buffer.

Another example embodiment provides a method comprising:

executing processing threads, using a multi-threaded processing element, as one or more process groups each of one or more processing threads, each process group having a process group identifier unique amongst the one or more process groups and being associated by capability data with a respective memory address range in a virtual memory address space;

translating, using memory address translation circuitry, a virtual memory address to a physical memory address by a processing thread of one of the process groups;

the memory address translation circuitry associating, with a translation of a given virtual memory address to a corresponding physical memory address, permission data defining one or more process group identifiers representing respective process groups permitted to access the given virtual memory address; and the memory address translation circuitry inhibiting access to the given virtual memory address in dependence on the capability data associated with the process group of the processing thread requesting the memory access and a detection of whether the permission data defines the process group identifier of the process group of the processing thread requesting the memory access.

Referring now to the drawings, FIG. 1 schematically illustrates an example of a data processing apparatus 2 comprising a processing pipeline 4 for processing instructions. In this example the processing pipeline 4 includes a number of pipeline stages including a fetch stage 6, a decode stage 8, an issue stage 10, an execute stage or processing element 12, and a write back stage 14, but it will be appreciated that other types or combinations of stages may be provided. For example a rename stage for performing register renaming could be included in some implementations. Instructions to be processed move from stage to stage, and while an instruction is pending at one stage another instruction may be pending at a different stage of the pipeline 4.

The fetch stage 6 fetches instructions from a level 1 (L1) instruction cache 20. The fetch stage 6 may usually fetch instructions sequentially from successive instruction addresses. However, the fetch stage may also have a branch predictor 22 for predicting the outcome of branch instructions, and the fetch stage 6 can fetch instructions from a (non-sequential) branch target address if the branch is predicted to be taken, or from the next sequential address if the branch is predicted not to be taken. The branch predictor 22 may include one or more branch history tables for storing information for predicting whether certain branches are likely to be taken or not. For example, the branch history tables may include counters for tracking the actual outcomes of previously executed branches or representing confidence in predictions made for branches. The branch predictor 22 may also include a branch target address cache (BTAC) 24 for caching previous target addresses of branch instructions so that these can be predicted on subsequent encounters of the same branch instructions.

The fetched instructions are passed to the decode stage 8 which decodes the instructions to generate decoded instructions. The decoded instructions may comprise control information for controlling the execute stage 12 to execute the appropriate processing operations. For some more complex instructions fetched from the cache 20, the decode stage 8 may map those instructions to multiple decoded instructions, which may be known as micro-operations (pops or uops). Hence, there may not be a one-to-one relationship between the instructions fetched from the L1 instruction cache 20 and instructions as seen by later stages of the pipeline. In general, references to "instructions" in the present application should be interpreted as including micro-operations.

The decoded instructions are passed to the issue stage 10, which determines whether operands required for execution of the instructions are available and issues the instructions for execution when the operands are available. Some implementations may support in-order processing so that instructions are issued for execution in an order corresponding to the program order in which instructions were fetched from the L1 instruction cache 20. Other implementations may support out-of-order execution, so that instructions can be issued to the execute stage 12 in a different order from the program order. Out-of-order processing can be useful for improving performance because while an earlier instruction is stalled while awaiting operands, a later instruction in the program order whose operands are available can be executed first.

The issue stage 10 issues the instructions to the execute stage 12 where the instructions are executed to carry out various data processing operations. For example the execute stage may include a number of execute units 30, 32, 34 including an arithmetic/logic unit (ALU) 30 for carrying out arithmetic or logical operations on integer values, a floating-point (FP) unit 32 for carrying out operations on values represented in floating-point form, and a load/store unit 34 for carrying out load operations for loading a data value from a level 1 (L1) data cache 36 to a register 40 or store operations for storing a data value from a register 40 to the L1 data cache 36. It will be appreciated that these are just some examples of the types of execute units which could be provided, and many other kinds could also be provided. For carrying out the processing operations, the execute stage 12 may read data values from a set of registers 40. Results of the executed instructions may then be written back to the registers 40 by the write back stage 14.

The L1 instruction cache 20 and L1 data cache 36 may be part of a cache hierarchy including multiple levels of caches. For example a level two (L2) cache 44 may also be provided and optionally further levels of cache could be provided. In this example the L2 cache 44 is shared between the L1 instruction cache 20 and L1 data cache 36 but other examples may have separate L2 instruction and data caches. When an instruction to be fetched is not in the L1 instruction cache 20 then it can be fetched from the L2 cache 44 and similarly if the instruction is not in the L2 cache 44 then it can be fetched from main memory 50. Similarly, in response to load instructions, data can be fetched from the L2 cache 44 if it is not in the L1 data cache 36 and fetched from memory 50 if required. Any known scheme may be used for managing the cache hierarchy.

The addresses used by the pipeline 4 to refer to program instructions and data values may be virtual addresses, but at least the main memory 50, and optionally also at least some levels of the cache hierarchy, may be physically addressed. Hence, a translation lookaside buffer 52 (TLB) may be provided, under the control of a memory management unit (MMU) 53 for translating the virtual addresses used by the pipeline 4 into physical addresses used for accessing the cache or memory. For example, the TLB 52 may include a number of entries each specifying a virtual page address ("VPA") of a corresponding page of the virtual address space and a corresponding physical page address ("PPA") to which the virtual page address should be mapped in order to translate the virtual addresses within the corresponding page to physical addresses. For example the virtual and physical page addresses may correspond to a most significant portion of the corresponding virtual and physical addresses, with the remaining least significant portion staying unchanged when mapping a virtual address to a physical address. As well as the address translation information, each TLB entry may also include some information ("perm") specifying access permissions such as indicating whether certain pages of addresses are accessible in certain modes of the pipeline 4. In some implementations, the TLB entries could also define other properties of the corresponding page of addresses, such as cache policy information defining which levels of the cache hierarchy are updated in response to read or write operations (e.g. whether the cache should operate in a write back or write through mode), or information defining whether data accesses to addresses in the corresponding page can be reordered by the memory system compared to the order in which the data accesses were issued by the pipeline 4.

While FIG. 1 shows a single level TLB 52, it will be appreciated that a hierarchy of translation may be provided by the MMU 53 and/or that multiple TLBs may be provided so that a level one (L1) TLB 52 may include TLB entries for translating addresses in a number of recently accessed pages and a level two (L2) TLB may be provided for storing entries for a larger number of pages. When a required entry is not present in the L1 TLB then it can be fetched from the L2 TLB, or from further TLBs in the hierarchy. Alternatively, a so-called intermediate physical address (IPA) may be used so that a first translation is from a virtual address to the IPA, and a second level of translation is from the IPA to a physical address. In this way, multiple levels of address translation can be used so that, for example, a first TLB (or hierarchy of TLBs) may be used to translate virtual addresses into intermediate addresses, and a second level of address translation using one or more further TLB(s) may then translate the intermediate addresses into physical addresses used to access a cache or memory. This can be useful for supporting virtualisation where the first level of address translation may be managed by the operating system and the second level of address translation may be managed by the hypervisor, for example.

In FIG. 1, a single stage and level of TLB 52 is shown, for clarity of the diagram.

If a required entry for a page to be accessed is not in any of the TLBs then a page table walk can be performed by the MMU 53 to access so-called page tables in the memory 50. Any known TLB management scheme can be used in the present technique.

As shown in FIG. 1, the apparatus 2 may have a set of bounded pointer registers 60. Whilst the set of bounded pointer registers is shown in FIG. 1 as being physically separate to the set of general purpose data registers 40, in one implementation the same physical storage may be used to provide both the general purpose data registers and the bounded pointer registers.

Each bounded pointer register 60 includes a pointer value 62 that may be used to determine an address of a data value to be accessed, and range information 64 specifying an allowable range of addresses when using the corresponding pointer 62. The bounded pointer register 60 may also include restrictions information 66 (also referred to as permissions information) which may define one or more restrictions/permissions on the use of the pointer. For example the restriction 66 could be used to restrict the types of instructions which may use the pointer 62, or the modes of the pipeline 4 in which the pointer can be used. Hence, the range information 64 and restriction information 66 may be considered to define capabilities $C_0$-$C_{M-1}$ within which the pointer 62 is allowed to be used. When an attempt is made to use a pointer 62 outside the defined capabilities, an error can be triggered. The range information 64 can be useful for example for ensuring that pointers remain within certain known bounds and do not stray to other areas of the memory address space which might contain sensitive or secure information. In an implementation where the same physical storage is used for both general purpose data registers and bounded pointer registers, then in one implementation the pointer value 62 may for example be stored within the same storage location as used for a corresponding general purpose register.

The execute stage 12 can be implemented by a multi-threaded processing element to execute one or more processing threads.

Figure 2:
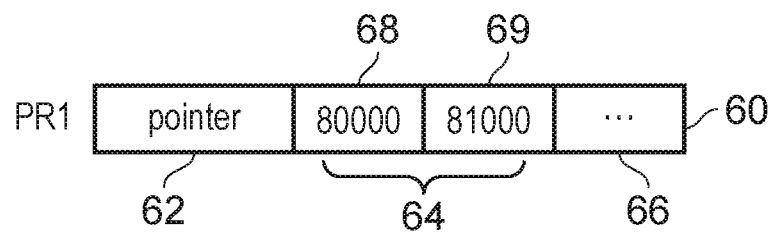
FIG. 2 schematically illustrates a bounded pointer.

FIG. 2 shows an example of types of instructions for which the allowable range is used to protect against unauthorised access to data or instructions. As shown in the top part of FIG. 2, a particular bounded pointer register PR1 includes a given pointer value 62 and range information 64, which in this example is specified using a lower bound address 68 defining the lower bound of the allowable range and an upper bound address 69 defining the upper bound of the allowable range. For example, the bounds 68, 69 are set to define a range of addresses 80000 to 81000. Errors may be triggered when certain instructions reference the bounded pointer register PR1 and the address determined from the pointer 62 is outside this range.

For example, as shown in part A of FIG. 2, in some systems an error may be triggered if there is an attempt to set the value of the pointer 62 in the pointer register 60 to a value lying outside the range specified by the range information 64 (here it being assumed that the pointer directly specifies an address). This avoids the pointer 62 taking any value outside the specified range so that any accesses using the pointer can be ensured to lie safely within the allowed range. Alternatively, as shown in part B of FIG. 2, an error can be triggered when an instruction attempts to access a location identified by the address of the pointer 62 when that address lies outside the specified range. Hence, it may still be allowable to set the pointer 62 to a value outside the specified range, but once a data access at the pointer address (or an address derived from the pointer) is attempted then an error may be triggered if the address lies outside the allowed range. Other systems may trigger errors in response to both the types of instruction shown in parts A and B of FIG. 2.

The range information 64 could be set in different ways and the manner by way it is set is an implementation detail and the present techniques do not depend on the specific method used. Purely as examples, privileged instructions, user-space code, secure code, or an operating system or hypervisor, may specify the range allowed for a given pointer. For example, the instruction set architecture may include a number of instructions for setting or modifying the range information 64 for a given pointer 62, and execution of these instructions could be restricted to certain software or certain modes or exception states of the processor 4. Any known technique for setting or modifying the range information 64 could be used.

In addition to the set of bounded pointer storage elements 60 that may be used at the execute stage 12 when executing certain instructions that make reference to a pointer, a program counter capability (PCC) register 80 may also be used to provide similar functionality at the fetch stage 6 when instructions are being fetched from the level one instruction cache 20. In particular, a program counter pointer may be stored in a field 82, with the PCC 80 also providing range information 84 and any appropriate restriction information 86, similar to the range and restriction information provided with each of the pointers in the set of bounded pointer storage elements 60. FIG. 1 also schematically illustrates a Default Data Capability (DDC) register 90 and a System Access Capability (SAC) register 95, both to be discussed below.

Figure 3:
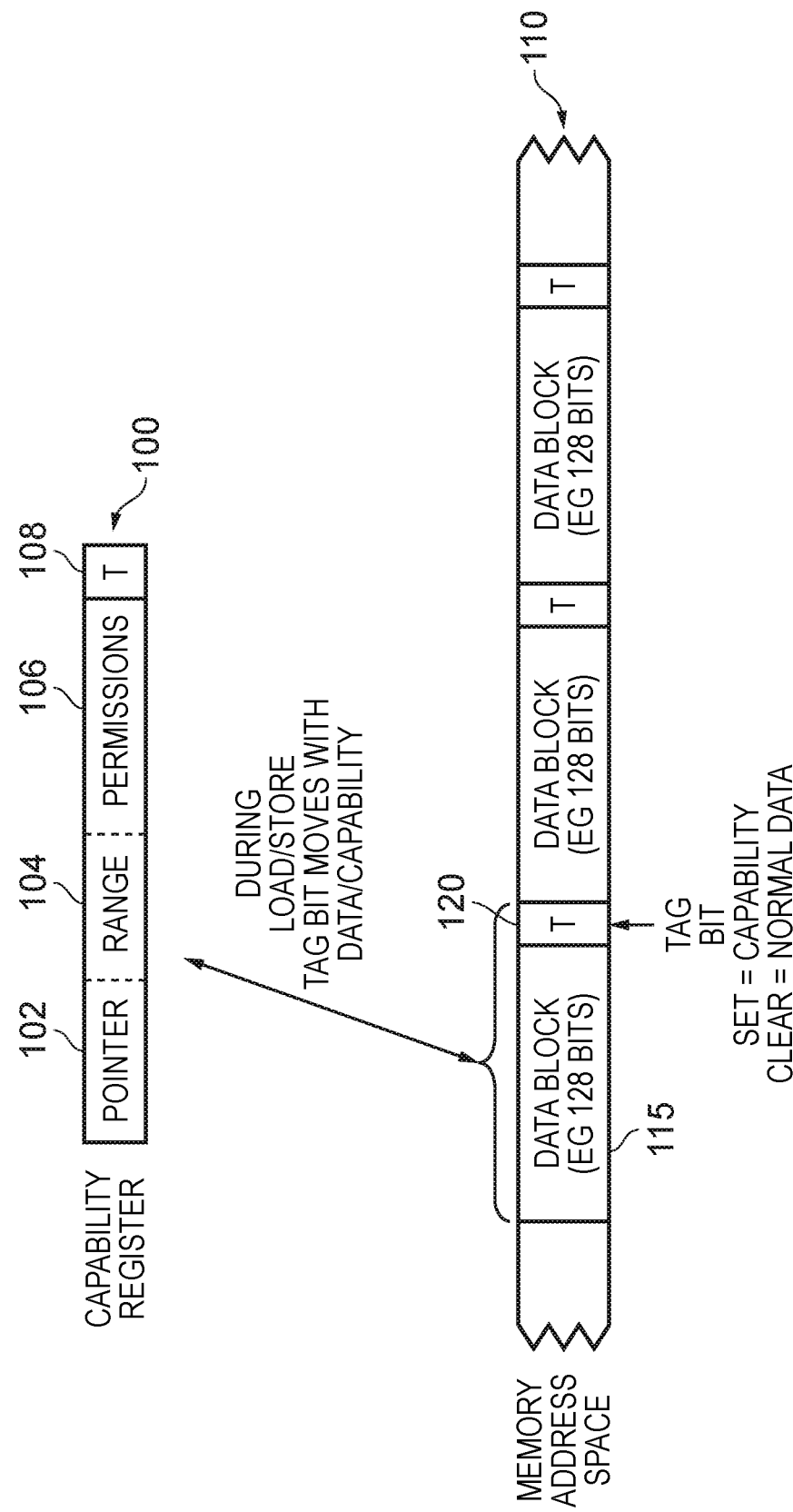
FIG. 3 schematically illustrates the use of a capability register.

FIG. 3 schematically illustrates how a tag bit is used in association with individual data blocks to identify whether those data blocks represent a capability (i.e. a bounded pointer and associated restrictions information), or represent normal data. In particular, the memory address space 110 will store a series of data blocks 115, which typically will have a specified size. Purely for the sake of illustration, it is assumed in this example that each data block comprises 128 bits. In association with each data block 115, there is provided a tag field 120, which in one example is a single bit field referred to as the tag bit, which is set to identify that the associated data block represents a capability, and is cleared to indicate that the associated data block represents normal data, and hence cannot be treated as a capability. It will be appreciated that the actual value associated with the set or the clear state can vary dependent on implementation, but purely by way of illustration, in one example implementation if the tag bit has a value of 1, it indicates that the associated data block is a capability, and if it has a value of 0 it indicates that the associated data block contains normal data.

When a capability is loaded into one of the bounded pointer registers 60 (also referred to as a capability register), such as the capability register 100 shown in FIG. 3, then the tag bit moves with the capability information. Accordingly, when a capability is loaded into the capability register 100, the pointer 102, range information 104 and restrictions information 106 (hereafter referred to as the permissions information) will be loaded into the capability register. In addition, in association with that capability register, or as a specific bit field within it, the tag bit 108 will be set to identify that the contents represent a capability. Similarly, when a capability is stored back out to memory, the relevant tag bit 120 will be set in association with the data block in which the capability is stored. By such an approach, it is possible to distinguish between a capability and normal data, and hence ensure that normal data cannot be used as a capability.

Returning to FIG. 1, in accordance with the techniques described here revocable bounded pointers can be generated that, in addition to the usual information associated with a bounded pointer, includes a first token value associated with a corresponding memory region for which that bounded pointer is to be used to control access. Further, for use in association with revocable bounded pointers that relate to the allocated instance of the memory region, a header is provided that is stored at a header location in memory, where that header has a first token field whose stored value is initialised to the first token value that is to be used in association with the revocable bounded pointer. The header location is arranged to be derivable from the range information provided by the revocable bounded pointer, hence enabling the header to be located at the time the bounded pointer is to be used to generate a memory address. When an allocated memory region is subsequently deallocated, then the stored value in the first token field is modified.

Capabilities

Although higher level applications can be arranged to run in "safe" constrained execution environments such as JAVA and JavaScript, lower layers of a system must generally provide the link to actual execution on hardware. As a result, almost all such layers are currently written in the C/C++ programming languages typically consisting of tens of millions of lines of trusted (but not trustworthy) code.

Ii is an aim to provide an underlying architectures to offer stronger inherent immunity to malicious attacks. Capabilities can provide one part of such a strategy.

The Capability data type represents a delegable token of authority to access one or more architecturally defined resources. Capabilities fall broadly into three types:

1) memory capabilities used to permit access to ranges of memory for data transfer and instruction fetch
2) system access capabilities used to permit access to certain system operations
3) sealing capabilities used to encapsulate other capabilities with an object type Each capability contains a number of logical fields, some of which are only present in certain capability types. Examples of such fields are shown schematically in FIG. 4.

Capability registers are used to hold capabilities and define extensions to the memory system so that capability properties are enforced when a capability is held in general purpose memory. Instructions can be provided to load and store capabilities from memory, use capability registers to access data and capabilities in memory, to branch using a capability and to manipulate capabilities held in capability registers without forging new rights.

Restrictions due to the use of capabilities are over and above those enforced by existing MMU and Exception Level based restrictions. Use of capabilities can be arranged not to weaken the protection already offered by those mechanisms.

Ambient Capabilities

On or more (for example, three) ambient capability registers may be provided defining ambient capabilities. Using these facilities, ambient effects of the capability extension can be enabled and disabled at each exception level. Enabling ambient effects at an exception level enables the effects of ambient capability registers, modifies the behaviour of exception entry and return to the level and modifies the behaviour of several existing instructions which naturally operate on addresses. In some examples, three ambient capability registers are provided:

(a) Program Counter Capability (PCC) Register

This restricts the use of instruction fetches. The PCC bounds and permissions may be updated using capability branch and return instructions and on exception entry and return.

(b) Default Data Capability (DDC) Register

The PCC affects data accesses relative to the program counter. Other data accesses are restricted either by the implicit use of a default data capability or by the explicit use of a capability as a base register.

(c) System Access Capability (SAC) Register

Access to system registers and system operations can be restricted by permissions held in the SAC register.

Translation Lookaside Buffer and Memory Management Unit

Figure 5:
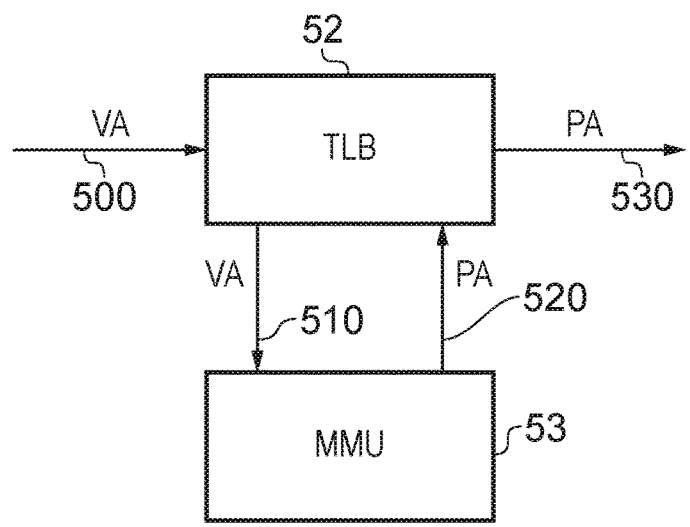
FIG. 5 schematically illustrates the use of a translation lookaside buffer (TLB) and a memory management unit (MMU)

In the apparatus of FIG. 1, a main reason why the MMU 53 is required is that it handles address translations which are not currently stored locally in the TLB 52. The way in which this is carried out will be discussed further below. In handling these matters, referring to FIG. 5, for a translation which is not currently held by the TLB 52, the MMU 130 receives requests 510 from the TLB relating to a virtual address 500 to be translated and returns responses 520 to the TLB 52 indicative of the required physical address (PA) 530 which is then output by the TLB 52. On the other hand, a translation which is already buffered by the TLB is simply output by the TLB, generally somewhat more quickly than one which the TLB has to obtain from the MMU 53. So from the point of view of the remainder of the system, the TLB provides a required translation but the speed at which this happens may depend on whether the translation is already buffered by the TLB.

Figure 6:
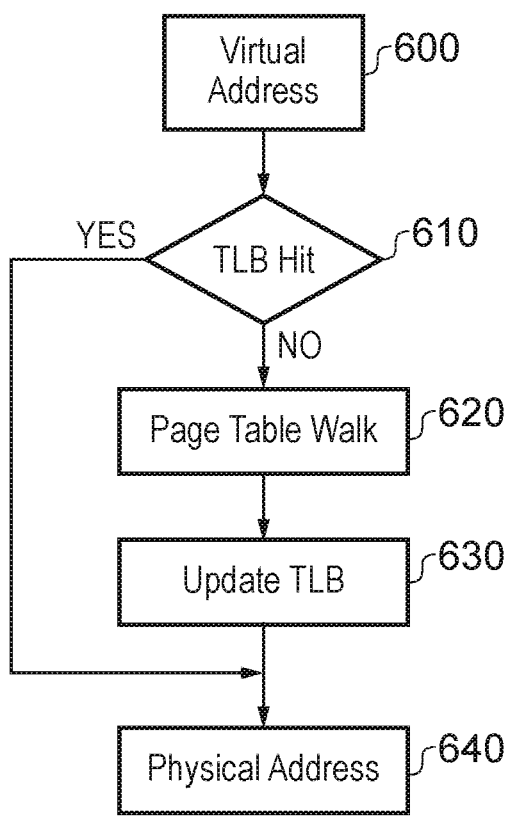
FIG. 6 is a schematic flowchart illustrating operations by a TLB and MMU.

These operations are also represented schematically by a flowchart of FIG. 6, the supply of a VA 500 to the TLB 52 forms a request for a corresponding PA 530 (shown in FIG. 6 as a step 600).

As mentioned, the TLB contains a cache or store of translations between VA and PA. The criteria by which the TLB stores particular VA to PA translations can be established according to known techniques for the operation of a TLB. The cached translations might include recently used translations, frequently used translations and/or translations which are expected to be required soon (such as translations relating to VAs which are close to recently-accessed VAs). Overall, the situation is that the TLB contains a cache of a subset of the set of all possible VA to PA translations, such that when a particular VA to PA translation is required, it may be found that the translation is already held in the cache at the TLB, or it may not.

Accordingly, at a next step 610, the TLB detects whether the required translation is indeed currently cached by the TLB (a "hit"). If the answer is yes, then control passes to a step 640 at which the PA 530 is returned for use in the required memory access.

If the answer is no, then control passes to a step 620 at which the TLB 52 sends a request, comprising the required VA 510, to the MMU 53. The MMU 53 derives the required VA to PA translation (for example using so-called page table walk (PTW) techniques) and sends at least the PA 520 corresponding to the VA 510 (and in the present examples, some permissions data to be discussed below) back to the TLB 102 where they are stored as a cached or buffered translation at a step 630.

Finally, at the step 640, the TLB 52 applies the translation stored at the TLB 52 to provide the output PA 530.

Compartments

In the present example apparatus, a process is modelled as a collection of one or more so-called compartments. For example, the execute stage 12 may be implemented by a multi-threaded processing element to execute processing threads as one or more process groups or compartments each of one or more processing threads, each process group or compartment having a process group compartment identifier (CID to be discussed below) unique amongst the one or more process groups and being associated by capability data with a respective memory address range in a virtual memory address space.

The compartments may be hybrid (hybrid compartment or HC) or pure (pure compartment or PC) and are managed by an instance of a compartment manager (CM). The compartment manager CM is considered to be a trusted and trustworthy component which has the ability to see the most or all of the available virtual memory address range. Therefore in example arrangements the processing element 12 is configured to implement a process group manager operable at least to allocate a process group identifier to each process group.

Figure 7:
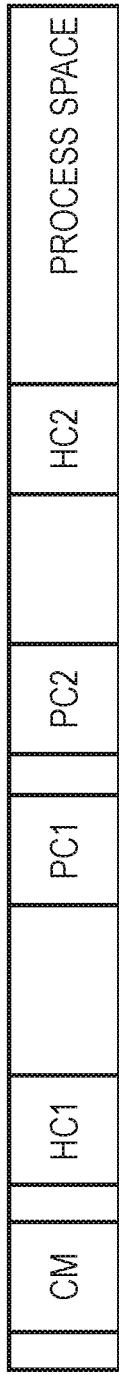
FIG. 7 schematically illustrates a set of compartments.

Each of the compartments may contain one or more threads. The schedulable entities are the threads. FIG. 7 schematically illustrates such an arrangement in the virtual memory address (VMA) space 700 (shown schematically with memory addresses increasing from left to right as drawn). Note that only user-space entities are visualized.

For hybrid compartments (such as HC1, HC2 in FIG. 7), data accesses are limited by the related DDC discussed above. Hybrid compartments can be used typically by applications and are limited by the ambient capabilities. they can create capabilities but this is not a requirement.

For pure compartments (such as PC1, PC2 in FIG. 7) operations are restricted by the ranges encoded in a specific set of one or more capabilities particular to that pure compartment. Pure compartments do not employ pointers and use capabilities exclusively.

Therefore, in these examples, for a first (hybrid) process group type, the capability data defines an allowable memory address range applicable to all process groups of the first type; and for a given process group of a second (pure) process group type, the capability data defines an allowable memory address range applicable to the given process group of the second process group type.

In example uses of compartmentalization, a feature can be provided whereby the number of system calls can be reduced, for example in order to increase efficiency, by allowing compartments to communicate with one other through shared memories or memory regions. That is to say, more than one compartment can access such a shared memory or memory region.

Figure 8:
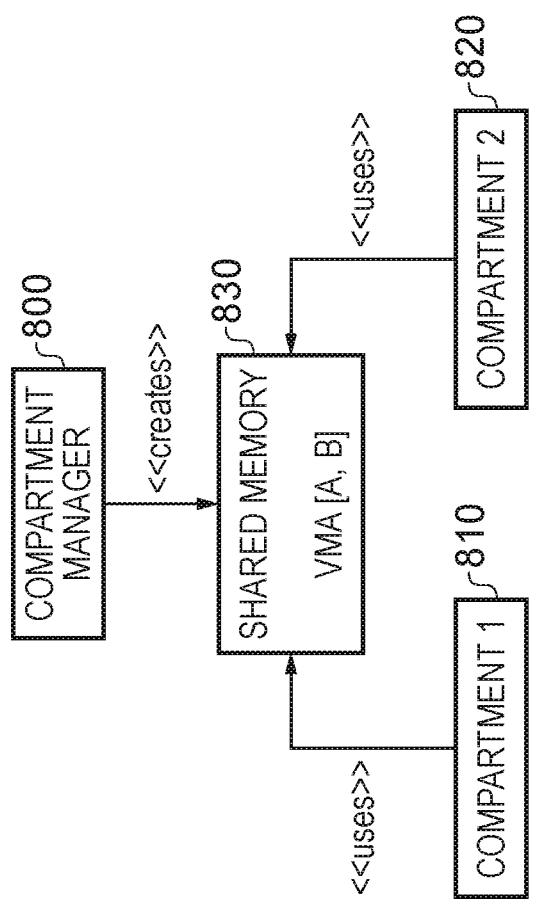
FIG. 8 schematically illustrates the establishment of a shared memory region by a compartment manager.

FIG. 8 schematically illustrates such an arrangement in which the compartment manager CM 800 oversees not only the provision of compartments 810, 820 but also the creation of one or more shared memory spaces 830 in virtual memory which are accessible by multiple compartments.

Figure 9:
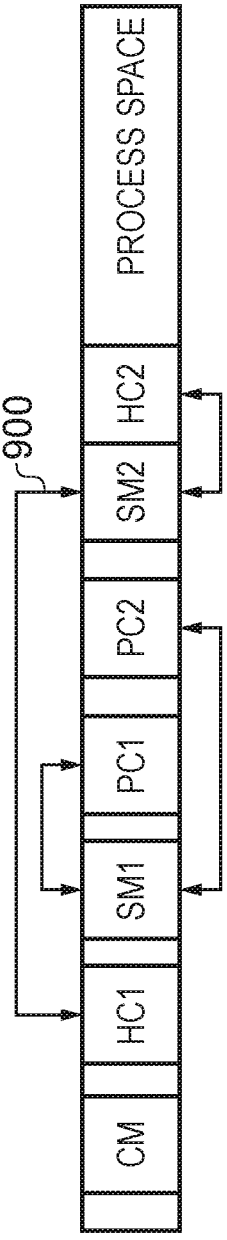
FIG. 9 schematically illustrates the use of a shared memory region.

FIG. 9 schematically illustrates (in a similar format to that of FIG. 7) a memory region SM1 shared between example pure compartments PC1 and PC2, and another example shared memory space SM2 shared between hybrid compartments HC1 and HC2. Access to the shared memory spaces are indicated schematically by arrows such as an arrow 900.

The present embodiments address certain features of a basic version of this approach:

A first feature is that in order to share memory between hybrid compartments, the shared memory has to be in the continuous range formed by the respective DDC.

A second feature is that once a memory region has been shared between two compartments it cannot be released in a safe manner because the set of all prevailing references to the shared memory is unknown.

Figure 10:
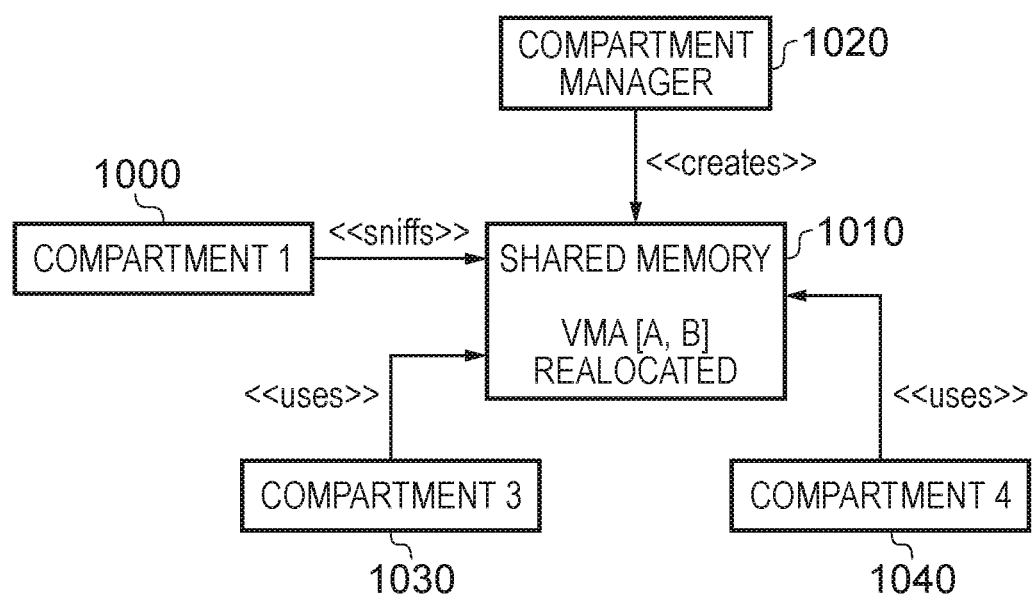
FIG. 10 schematically illustrates the reallocation of a shared memory region.

Valid references may (at any particular time) be stored in registers, pushed onto the stack or saved as data. Therefore, even if shared memory is released, valid references to that may be kept in one of these forms by some part of the executing code. Such a retained reference would provide a potential way in which data in a previously-shared but no-longer-shared could be altered or "sniffed" (read or sampled) even after that memory region is reallocated to an overlapping memory address range. Such an outcome could be referred to as an undesirable "use-after-free" situation and is illustrated schematically in FIG. 10, which represents a previously (but no longer) authorized compartment 1000 sniffing or accessing a shared memory 1010 now allocated by the CM 1020 for sharing between compartments 1030 and 1040.

Embodiments of the present technique address these issues by providing a revocation mechanism for effectively revoking permissions for compartments to access or share memory regions. One possible alternative example revocation mechanism could involve an advanced MMU configuration where mapping and un-mapping memory regions is used frequently thus revoking references. However, this approach is not used in the present embodiments because it could increase code complexity of the compartment manager and could possibly elevate TLB pressure (processing requirements) to an unacceptable level.

Therefore, embodiments of the present disclosure aim to provide another technique to address the issue of not leaving valid references behind and knowing their number.

Compartment Identifiers

Compartments may always be uniquely identified in the system. For this, an appropriate identifier generation method is used. Compartment identifiers (CIDs), are just like process identifiers (PIDs) except for they relate to an inline portion of a process. The current CID is stored in a register. Each CID is (in these examples) unique amongst other prevailing CIDs.

Translation Descriptor

The basis of the solution is to implement a new translation descriptor (TD) format as an extension. Such a descriptor may contain (for example) at most two CIDs to define compartments which have access to that memory range. The memory is not accessible if no CID is set in the TD in at least some circumstances to be discussed later (for example, relating to pure compartments). Furthermore, the architecture shall be changed to have a different memory access check when store and load operations are being executed through capabilities, including ambient capabilities.

Figure 11:
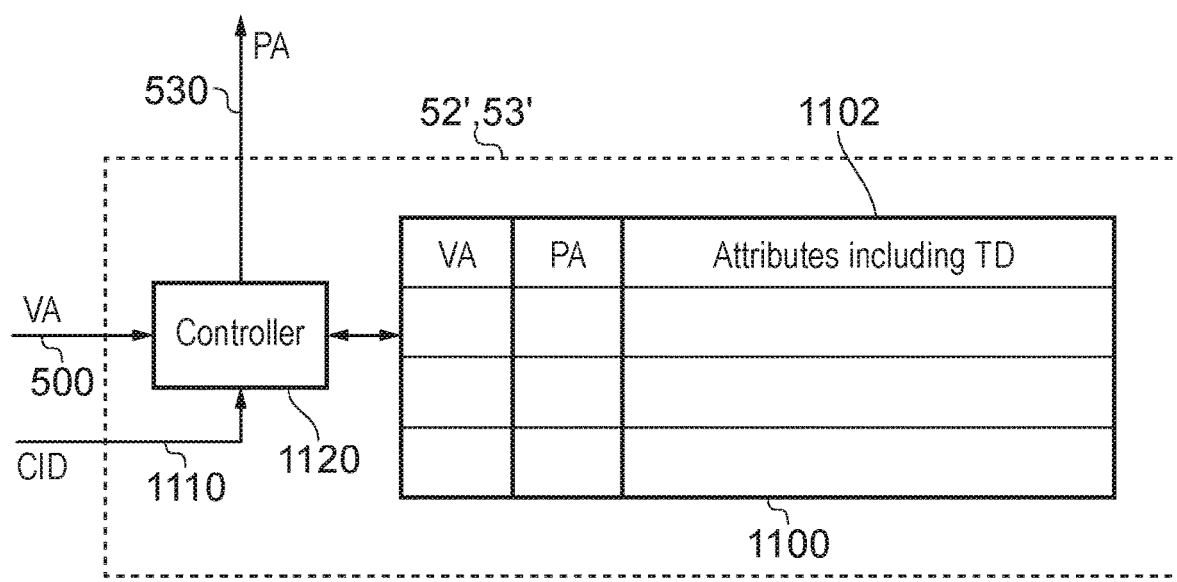
FIG. 11 schematically illustrates a memory address translation unit.

FIG. 11 schematically illustrates the use of a TLB 52' or an MMU 53' (for example, if a TLB is not in use) which buffers, in a cache 1100, one or more attributes 1102 associated with each VA to PA translation, the attributes including the TD. The TLB 52' and/or MMU 53' provide an example of the use of memory address translation circuitry comprising one or both of: a memory management unit; and a translation lookaside buffer.

In some examples, the TLB 52'/MMU 53' may receive as an input a CID 1110 of a compartment attempting to access a particular memory address, page or region, and detect, using a controller 1120, with reference to the stored attributes whether or not the access is allowed.

The checks conducted by the controller 1120 and the resulting access permissions may be implemented as follows.

The memory address translation circuitry (such as the TLB and/or MMU) is arranged to translate a virtual memory address to a physical memory address in response to a requested memory access by a processing thread of one of the process groups. It is also configured to associate, with a translation of a given virtual memory address to a corresponding physical memory address, permission data (such as TD) defining one or more process group identifiers (CIDs) representing respective process groups permitted to access the given virtual memory address, and to inhibit access to the given virtual memory address in dependence on the capability data associated with the process group of the processing thread requesting the memory access and a detection of whether the permission data defines the process group identifier of the process group of the processing thread requesting the memory access.

Access for Hybrid Compartments

The test is as follows: [check against DDC] OR [check MMU for CID]

In other words, as shown by the table in FIG. 12, if either or both of the left two columns is true (the access is within allowable DDC bounds; the TD defines that CID) then the access is allowed.

The proposed arrangement can simplify memory sharing with hybrid compartments. Shared memory may be outside of DDC bounds yet accessible. The access is granted by the MMU if the shared memory is described by the new TD and the CIDs are set properly. If shared memory is outside of DDC bounds and there is no TD present then the access shall be denied.

Therefore, in these examples, for a given process group of the first (hybrid) process group type, the memory address translation circuitry is configured to allow access to the given virtual memory address when either or both of:

(i) the capability data indicates that the given virtual memory address lies within the allowable memory address range for the given process group; and (ii) the process group identifier for the given process group is a process group identifier defined by the permission data;

and to inhibit access otherwise.

Access for Pure Compartments

The test is as follows: [check against capability] AND [check MMU and CID, if set]

In other words, as shown by the table in FIG. 13, if both of the left two columns is true (the access is defined by a valid capability; the TD defines that CID) and the memory address or region is not mapped otherwise, then the access is allowed.

The present arrangement can strengthen or harden security when it comes to pure compartments. Previously, such compartments could access data if a valid capability existed. The proposed TD format changes this behaviour.

Therefore, in these examples, for a given process group of the second (pure) process group type, the memory address translation circuitry is configured to allow access to the given virtual memory address when both of:

(i) the capability data indicates that the given virtual memory address lies within the allowable memory address range for the given process group; and (ii) the process group identifier for the given process group is a process group identifier defined by the permission data;

and to inhibit access otherwise.

Use of the MMU for these Tests

This arrangement provides an access check treats MMU as an equal permission provider to the permission features discussed above, rather than (as in the case of previously proposed MMUs) a lower layer access controller.

Figure 14:
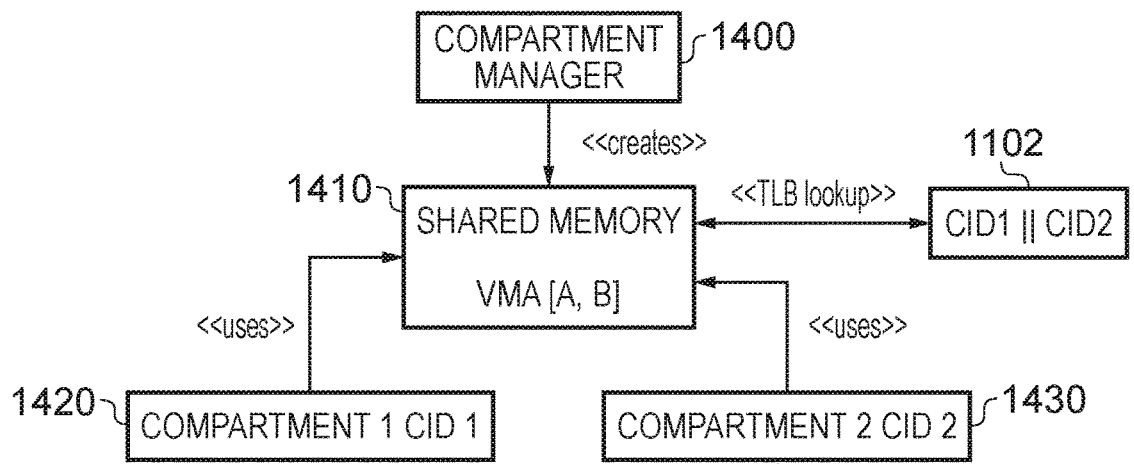
FIGS. 14 to 16 schematically illustrate the reallocation of a shared memory region.
Figure 15:
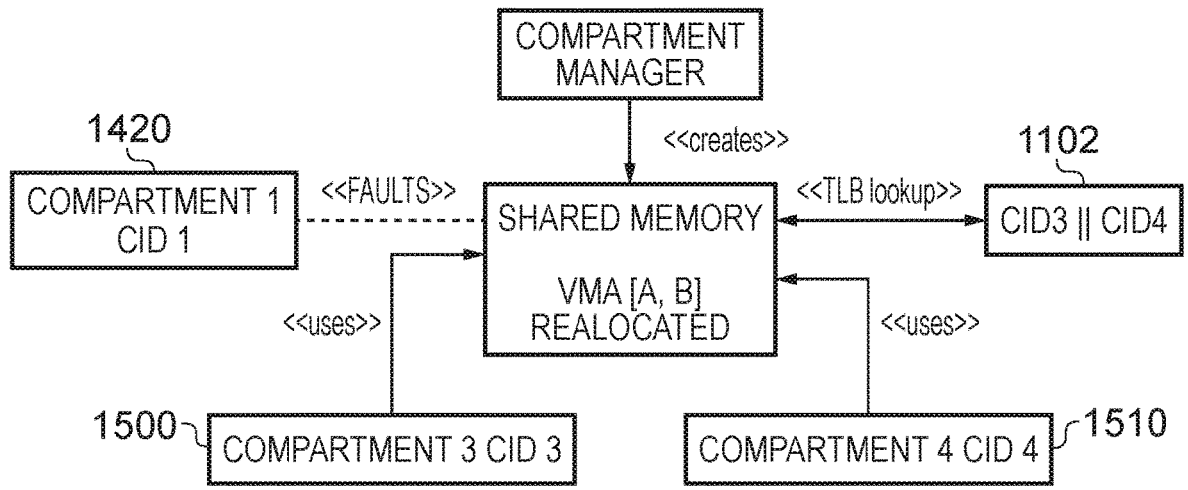
Figure 16:
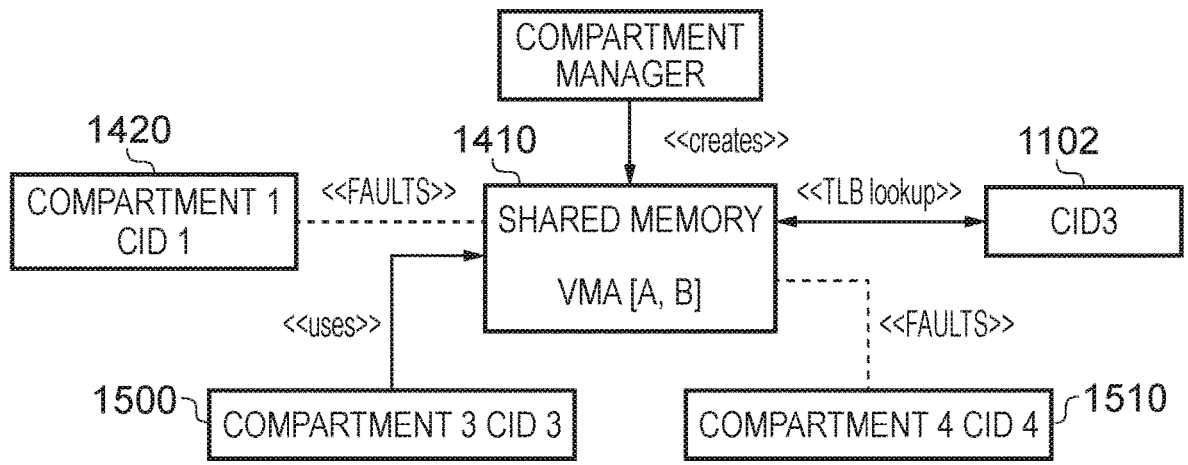

Examples—FIGS. 14 to 16

Examples of these techniques will now be described with reference to FIGS. 14 to 16, in which a compartment manager 1400 creates and oversees access to a shared memory region 1410 defined by virtual memory bounds A, B. Accesses to the shared memory region require memory address translation by the TLB 52'/MMU 53' in which the attribute data 1102 is consulted. In FIGS. 14 to 16 only the tests discussed above relating to the CID of the TD are illustrated.

In FIG. 14, the shared memory region 1410 has been established to be shared between compartments 1420, 1430 with respective CIDs CID1 and CID2. The TD specifies "CID1 or CID2" so any access by the compartments 1420, 1430 is (from the point of view of the part of the test relating to the CID) allowable.

In FIG. 15, the shared memory has been reallocated to compartments 1500, 1510 having respective CIDs of CID3, CID4. The TD now specifies "CID1 or CID2" so any access by the compartments 1500, 1510 is (from the point of view of the part of the test relating to the CID) allowable. However, an attempted access by the compartment 1420 with CID=CID1 fails the CID test performed at memory translation and so is not permitted.

In this way, the shared memory has been successfully reallocated. The previous permission given to the compartment 1420 has been removed by amending the TD associated with the shared memory region, without the need to identify and locate any outstanding references to the shared memory.

A further example is illustrated in FIG. 16 in which the shared nature of the memory region 1410 has been revoked so that access is permitted only for the compartment 1500 with CID=CID3. Any attempted accesses by the compartments 1420, 1510 (or indeed any other compartment) are disallowed by failure of the TD comparison with the CID of the compartment requesting memory translation.

Figures 17, 18:
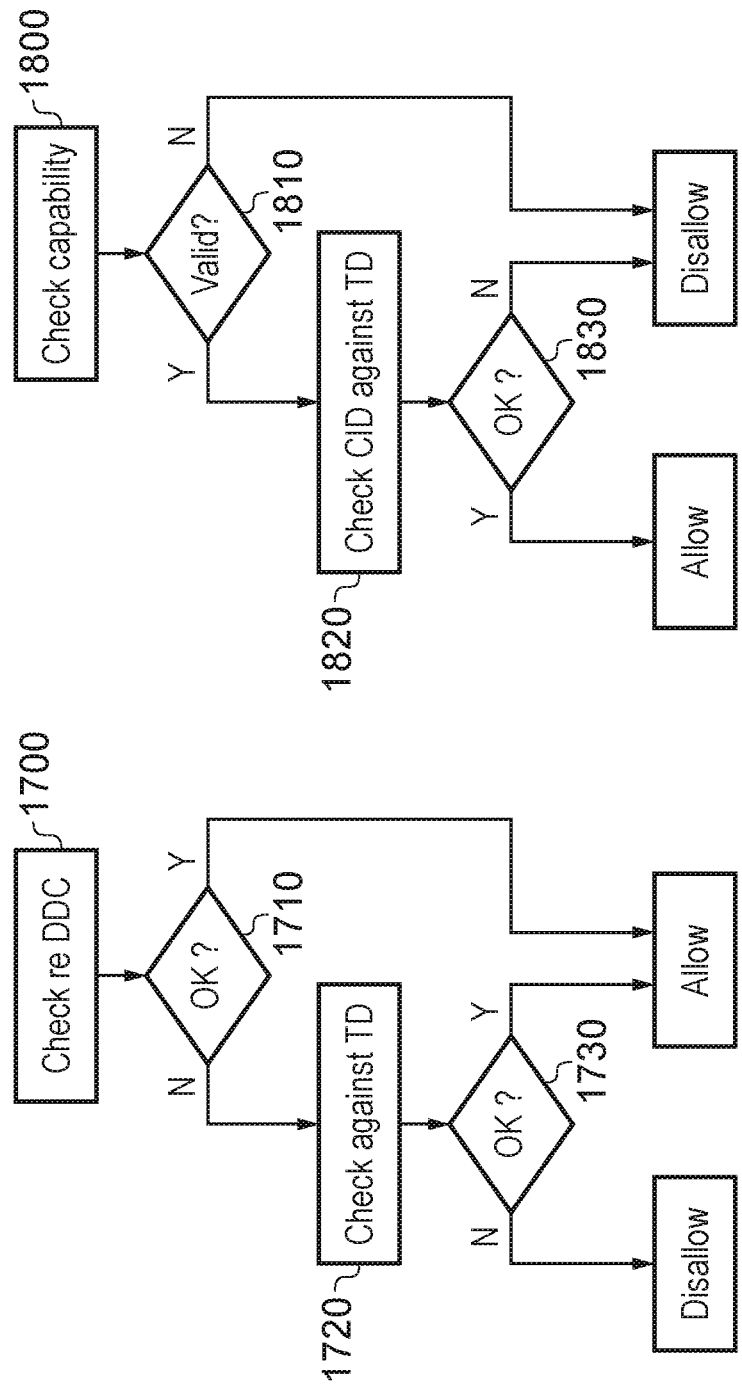
FIGS. 17 to 21 are schematic flowcharts illustrating respective methods.

FIGS. 17 and 18 are schematic flowcharts summarising these processes.

FIG. 17 refers to hybrid compartments. At a step 1710, the memory access is checked as to whether it is allowable taking into account the bounds set by the relevant DDC. If (at a step 1710) the answer is yes, then the access is allowed. If not, then at a step 1720 a check is made by the MMU or TLB as to whether the CID is covered by a group of one or more CIDs specified by the TD. If yes (at a step 1730) then the access is allowed. If not then the access is disallowed.

For pure compartments, FIG. 18 refers. At a step 180, the capability relating to the accessing compartment is checked for validity. If (at a step 1810) it is valid then control passes to a step 1820. if not, then the access is disallowed. At the step 1820, the CID of the requesting compartment is checked by the TLB/MMU against the TD. If (at a step 1830) the CID is covered by the one or more specified by the TD then the access is allowed. If not then the access is disallowed.

Potential Benefits

As discussed above, an allocation of shared memory can be easily revoked by changing the TD format even if valid references still exist. In addition to this, VMA ranges may be reused at any time when CIDs are set properly in the new TD formats. Shared memory can be revoked any time but with actually keeping the mapping on one side of the share (so for example a shared memory between CID3 and CID 4 can be revoked as far as CID4 is concerned but maintained for CID3 simply by changing the TD to specify CID3 only.

Since all the memory accesses go through address translation anyway, the present solution does not have performance penalty.

The TD format potentially simplifies TLB management resulting in potentially less TLB flush. Pure compartments may be described by a single TLB entry, with the access type being encoded in capabilities. Hybrid compartments may have one TLB entry per memory kind with access type being enforced by the MMU.

Population of the TD

Figure 19:
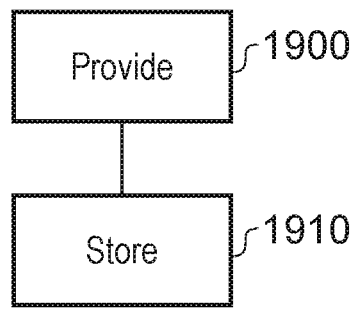

Referring to FIG. 19, in an example arrangement the compartment manager (or process group manager) operates as a process which is responsible for overseeing the sharing of memory. In some examples the CM may itself populate the TD field or in other examples it is an entity which has the privilege to request the kernel to populate the TD field. A compartment other than the CM does not (in example arrangements) have the privilege to populate the TD field or to request the kernel to do this.

For a memory address range for which access is to be shared between two or more process groups, the CM can provide or request the kernel to provide (at a step 1900) to the memory address translation circuitry the process group identifiers for the two or more process groups; and the memory address translation circuitry is configured to store (at a step 1910) the process group identifiers for the two or more process groups as the permission data. this can be performed as part of establishing the shared memory region.

Figure 20:
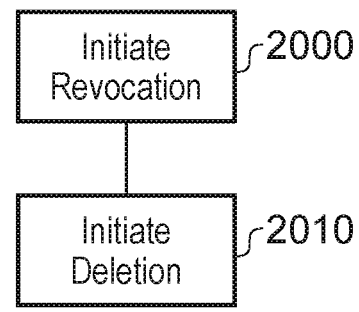

Similarly, the CM (process group manager) is configured to initiate (at a step 2000 of FIG. 20) revocation of access to a memory address range by a given process group, by initiating (at a step 2010) deletion from the permission data held by the memory address translation circuitry, of the process group identifier for the given process group.

Figure 21:
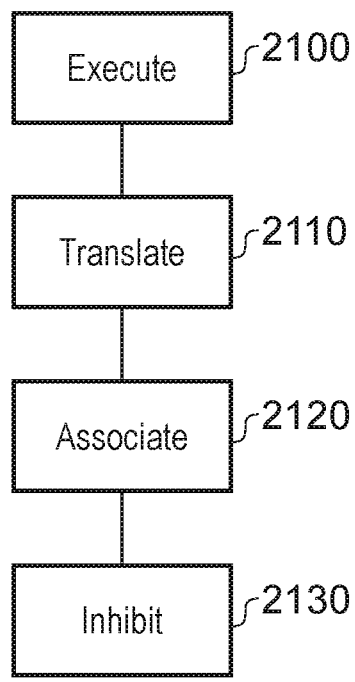

FIG. 21 is a schematic flowchart illustrating a method comprising:

executing (at a step 2100) processing threads, using a multi-threaded processing element, as one or more process groups each of one or more processing threads, each process group having a process group identifier unique amongst the one or more process groups and being associated by capability data with a respective memory address range in a virtual memory address space;

translating (at a step 2110), using memory address translation circuitry, a virtual memory address to a physical memory address by a processing thread of one of the process groups;

the memory address translation circuitry associating (at a step 2120), with a translation of a given virtual memory address to a corresponding physical memory address, permission data defining one or more process group identifiers representing respective process groups permitted to access the given virtual memory address; and the memory address translation circuitry inhibiting (at a step 2130) access to the given virtual memory address in dependence on the capability data associated with the process group of the processing thread requesting the memory access and a detection of whether the permission data defines the process group identifier of the process group of the processing thread requesting the memory access.

Figure 22:
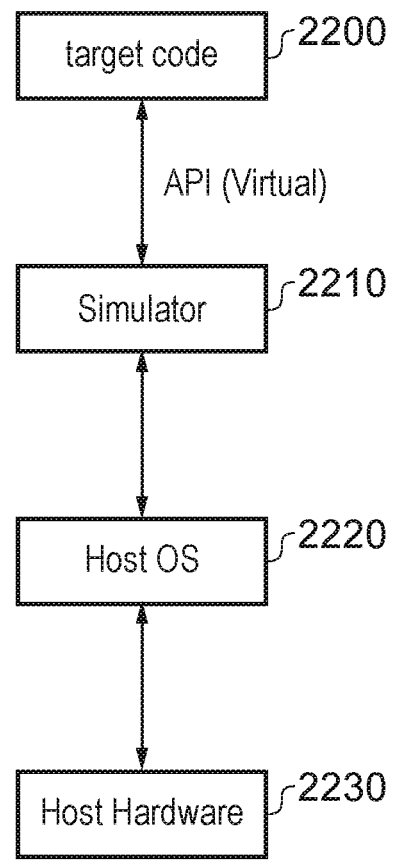
FIG. 22 schematically illustrates a simulator implementation.

FIG. 22 illustrates a simulator implementation that may be used. Whilst the earlier described embodiments implement the present techniques in terms of apparatus and methods for operating specific processing hardware supporting the techniques concerned, it is also possible to provide an instruction execution environment in accordance with the embodiments described here which is implemented through the use of a computer program.

Such computer programs are often referred to as simulators, insofar as they provide a software based implementation of a hardware architecture. Varieties of simulator computer programs include emulators, virtual machines, models, and binary translators, including dynamic binary translators.

Typically, a simulator implementation may run on a host processor 2230, optionally running a host operating system 2220, supporting the simulator program 2210. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 2230), some simulated embodiments may make use of the host hardware, where suitable.

The simulator program 2210 may be stored on a computer-readable storage medium (which may be a non-transitory medium), and provides a program interface (instruction execution environment) to the target code 2200 (which may include applications, operating systems and a hypervisor) which is the same as the application program interface of the hardware architecture being modelled by the simulator program 2210. Thus, the program instructions of the target code 2200, including the functionality described above, may be executed from within the instruction execution environment using the simulator program 2210, so that a host computer 2230 which does not actually have the hardware features of the apparatus discussed above can emulate these features.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device (such as a processing element as discussed above) may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. Apparatus comprising:
multi-threaded processing circuitry to execute processing threads as one or more process groups, where each of the one or more process groups includes a plurality of the processing threads, and each process group has a process group identifier unique among the one or more process groups and is associated with capability data having a respective memory address range in a virtual memory address space; and
memory address translation circuitry to translate a virtual memory address to a physical memory address by a processing thread of one of the process groups;
the memory address translation circuitry being configured to:
associate, with a translation of a given virtual memory address to a corresponding physical memory address, permission data defining one or more process group identifiers representing respective process groups permitted to access the given virtual memory address, wherein the permission data restricts at least one of: types of instructions which may access the given virtual memory address as part of said respective process groups, and operational modes of a pipeline of the multi-threaded processing circuitry in which the given virtual memory address can be accessed, and
inhibit access to the given virtual memory address in dependence on the capability data associated with the process group of the processing thread requesting the memory access and a detection of whether the permission data defines the process group identifier of the process group of the processing thread requesting the memory access;
wherein:
for a first process group type, the capability data defines an allowable memory address range applicable to all process groups of the first type; and
for a given process group of a second process group type, the capability data defines an allowable memory address range applicable to the given process group of the second process group type.

2. Apparatus according to claim 1, in which the processing element is configured to implement a process group manager operable at least to allocate a process group identifier to each process group.

3. Apparatus according to claim 2, in which:
the process group manager is operable, for a memory address range for which access is to be shared between two or more process groups, to provide to the memory address translation circuitry the process group identifiers for the two or mom process groups; and
the memory address translation circuitry is configured to store the process group identifiers for the two or more process groups as the permission data.

4. Apparatus according to claim 3, in which the process group manager is configured to initiate revocation of access to a memory address range by a given process group, by initiating deletion from the permission data held by the memory address translation circuitry, of the process group identifier for the given process group.

5. Apparatus according to claim 1, in which, for a given process group of the first process group type, the memory address translation circuitry is configured to allow access to the given virtual memory address when either or both of:
(i) the capability data indicates that the given virtual memory address lies within the allowable memory address range for the given process group; and
(ii) the process group identifier for the given process group is a process group identifier defined by the permission data;
and to inhibit access otherwise.

6. Apparatus according to claim 1, in which, for a given process group of the second process group type, the memory address translation circuitry is configured to allow access to the given virtual memory address when both of:
(i) the capability data indicates that the given virtual memory address lies within the allowable memory address range for the given process group; and
(ii) the process group identifier for the given process group is a process group identifier defined by the permission data;
and to inhibit access otherwise.

7. Apparatus according to claim 1, in which the memory address translation circuitry comprises one or both of: a memory management unit; and a translation lookaside buffer.

8. Apparatus according to claim 1, wherein the first type of process group includes a generic capability, hybrid type process group and the second type of process group includes a specific capability, pure type of process group.

9. A method comprising:
executing processing threads, using multi-threaded processing circuitry, as one or more process groups, where each of the one or more process groups includes a plurality of the processing threads, and each process group has a process group identifier unique among the one or more process groups and is associated with capability data having a respective memory address range in a virtual memory address space;
translating, using memory address translation circuitry, a virtual memory address to a physical memory address by a processing thread of one of the process groups;
the memory address translation circuitry associating, with a translation of a given virtual memory address to a corresponding physical memory address, permission data defining one or more process group identifiers representing respective process groups permitted to access the given virtual memory address, wherein the permission data restricts at least one of: types of instructions which may access the Liven virtual memory address as part of said respective process groups and operational modes of a pipeline of the multi-threaded processing circuitry in which the given virtual memory address can be accessed; and
the memory address translation circuitry inhibiting access to the given virtual memory address in dependence on the capability data associated with the process group of the processing thread requesting the memory access and a detection of whether the permission data defines the process group identifier of the process group of the processing thread requesting the memory access;
wherein:
for a first process group type, the capability data defines an allowable memory address range applicable to all process groups of the first type; and
for a given process group of a second process group type, the capability data defines an allowable memory address range applicable to the given process group of the second process group type.

10. The method according to claim 9, wherein the first type of process group includes a generic capability, hybrid type process group and the second type of process group includes a specific capability, pure type of process group.

\* \* \* \* \*